May 5, 1953 W. GEHRIG 2,637,295
ANGLE OF ATTACK CONTROLLED SAFETY DEVICE FOR AIRCRAFT
Filed Sept. 15, 1949

INVENTOR.
Walter Gehrig

Patented May 5, 1953

2,637,295

UNITED STATES PATENT OFFICE 2,637,295

ANGLE OF ATTACK CONTROLLED SAFETY DEVICE FOR AIRCRAFT

Walter Gehrig, Flint, Mich.

Application September 15, 1949, Serial No. 115,811

20 Claims. (Cl. 116—117)

1

The present invention relates to angle of attack governed apparatus for aircraft. It is actuated and controlled solely by air pressure induced by the airstream flowing about the aircraft during flight. An airflow actuated motor means is controlled by the airflow in a control-conduit. The airflow in the control-conduit in turn is controlled by a valve coupled to an unstable control vane projecting into the airstream. The valve opens and closes ports in a conduit means fluid connecting the control-conduit and motor means alternately with zones of positive and negative pressure, causing airflow and pressure reversal in the control-conduit and motor means in accordance with direction changes of the airstream against the control vane. The airflow actuated motor means may be used to control any kind of apparatus member in accordance with the airstream's angle of attack relative any type of aircraft.

For purpose of simple illustration the apparatus is hereafter described as an angle of attack and stall warning indicator for airplanes. The airflow actuated motor means raises and lowers a signal rod within the pilot's line of forward vision through the windshield.

In maneuvering of aircraft, positions are reached in which the aircraft attitude may approach a position known as a "stall" during which the lift of the wing falls off rapidly, often causing an accident. The above aircraft attitude is determined by the angle of attack of the aircraft with respect to the airstream.

When a wing cuts through the air in flight, the airstream is separated in front of the wing's leading edge, part of the deflected air flowing over the wing and the rest flowing under the wing. As is well known, positive pressure exists at the under surface of a wing and a negative pressure condition exists on the upper surface thereof. As the angle of attack between the wing and airstream changes, the air separation point on the leading edge of the wing moves upward and downward in accordance with the angle of attack, what in turn results in a reversal of the direction of airflow in a zone on the leading edge upon passage of the air separation point. This reversal of airflow within a zone on the surface of an aircraft body lends itself to control the action of the angle of attack controlled safety device described hereafter. The described vane and valve control however is not limited to this preferred form of installation, it can also be mounted in the undisturbed airstream.

Various angle of attack and stall warning in-

2 dicators, operated in response to pressure or airflow changes have been known prior to the present invention. However, most such devices are subject to nuisance signals of short duration in response to air gusts which cause momentary pressure or airflow changes.

The object of the present invention is to provide an improved, simple, economical and reliable angle of attack indicator which operates automatically in accordance with the angle of attack of the aircraft.

Another object is to provide an angle of attack governed apparatus comprising means to absorb momentary pressure changes in a control conduit and to eliminate nuisance action caused by momentary gusts.

Another object of the present invention is to provide an angle of attack governed apparatus which is not dependent on a special power supply, such as electricity, for its operation. The motive power for the actuation of the present invention is induced by the airstream flowing about the aircraft in flight.

Another object of the present invention is to improve the efficiency thereof by providing positive and negative air pressure for its operation, the pressure reversal being controlled by a vane and valve.

These objects and several novel features of the invention are hereinafter more fully described and claimed and the preferred form of construction by which these objects are attained is shown in the accompanying drawing in which:

Figure 1 is a fragmentary vertical transverse section through the leading edge of an aircraft wing. A vane housing, valve chamber and conduit portions are also shown in midsection. A vane and valve are shown in "up" or "on" position. A gust absorption chamber is shown interconnected in a control conduit.

Figure 2 is a cross-section through the vane housing and valve taken on line A—A in Figure 1.

Figure 1:
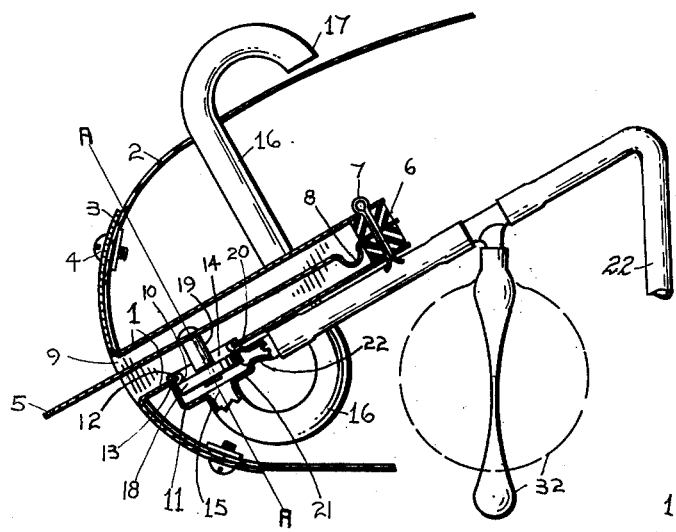

Figure 1 in the drawing shows a vane housing 1 of rectangular cross-section secured to the leading edge of an airplane wing 2 by means of a flange 3 and screws 4. A vane blade 5 is secured to a fixed closure member 6 in the back end of the vane housing. The closure member consists of two resilient rubber blocks 6 pressed into the back end of the vane housing 1. The back end of the vane 5 is inserted between the rubber blocks and the whole assembly is traversed by a cotter pin 7 to hold said parts in place as shown in the drawing. The front portion of the vane 5 is adapted to oscillate about pivotal spring crimps 8 in the back and about the resilient closure member 6. The free leading end of the vane blade 5, in a spanwise plan, projects forward through an opening 9 in the flange 3 and vane housing 1. A circular hole in the bottom face of the vane housing has the circular neck 10 of a valve chamber and conduit member 11 slip fit inserted therein. Shoulders 12, 13 on top and bottom of said neck lock the valve chamber 11 rotatably to the vane housing 1. This feature of construction makes it possible to use the same vane-valve and conduit assembly for left and right wing installations. The valve chamber and the connected control conduit 22 can also be rotated for installation to facilitate passage of same through the slot in the wing-skin. The valve chamber has an air inlet port 14 and an air outlet port 15 generally concentric with said neck 10. The inlet port 14 is in fluid connection with the airstream during flight through the opening 9 in the face of the vane housing. The outlet port 15 is in fluid connection with the negative pressure zone on the upper surface of the wing 2 through a conduit 16. The conduit end 17 on the outside of the upper wing surface is return bent to prevent water from running into it. A valve 18 in the valve chamber 11 is operatively coupled with the vane 5 by means of a connector 19 extending through the inlet port 14. Said connector 19 comprises a reduced taper neck 31 encircled by the valve 18 of rubber or other suitable material. The valve 18 is adapted to tilt about the pivotal valve and neck assembly to adjust itself to the contacted valve seat. The upper end of the connector 19 is secured to the vane blade 5 by means of a rivet head 32 as shown in the drawing. Said valve 18 is adapted to travel between the valve seats 20, 21 encircling said ports 14, 15 to alternately open one port and close the other one when the coupled vane oscillates. The oscillating travel of the vane 5 consequently is limited by the short travel of the valve 18. The sides of the valve 18 slip fit the sides of the valve chamber 11 and act as a transverse guide for the oscillating front portion of the vane 5 (Figure 2). The width of the vane blade 5 is considerably smaller than the adjacent inside width of its housing 1. The coupled valve oscillatably holds the edges or sides of the control vane equidistant from its housing. The front opening 9 in the vane housing also provides clearance on top and bottom of the adjacent vane portion. The control vane consequently does not contact the front portion of its housing which in turn eliminates freezing together of the two parts. Conduit means in the form of a tube 22 fluid connects the valve means with the motor means.

A gust pressure absorption device inter-connected in the control conduit 22 comprises an expansible and contractible air-chamber in the form of a flexible bladder 32 adapted to freely expand and contract with pressure reversals therein.

Any airflow controlled motor means can be connected with the control conduit 22 to be actuated by the pressure changes therein in accordance with the vane and valve positions. An airflow actuated motor means having an apparatus member operatively connected thereto is described hereafter.

Figure 3:
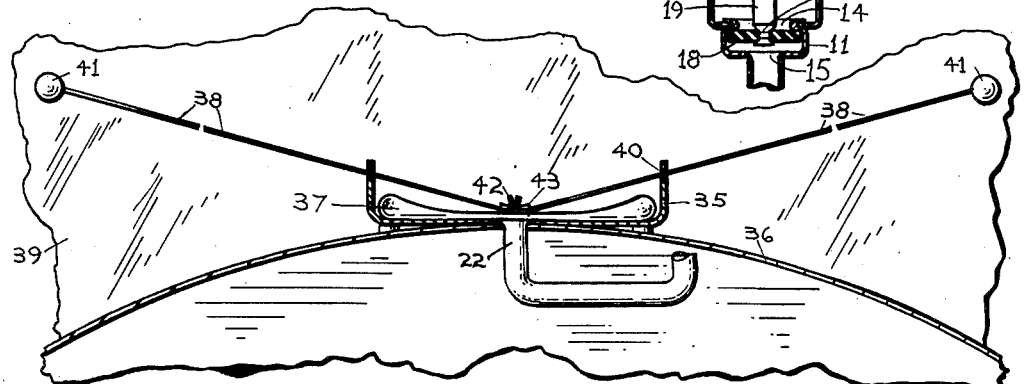
Figure 3 illustrates a visual angle of attack indicator.

A visual signal means illustrated in Figure 3 comprises a box-shaped retainer 35 fixed to the top of the instrument panel 36. The retainer box contains an expansible and contractible chamber 37 in fluid connection with the vane and valve controlled valve chamber 11 through a control conduit 22. A visual indicator in the form of transverse wire rods 38 is positioned within the pilot's line of vision forward through the windshield 39. Each rod is pivotally and slidably mounted in a hole 40 in the retainer wall 35. The longer outside portion of each rod has a small ball 41 on the end thereof. The other end portion of each rod forms a hook 42 inserted under and passing through a connector strip 43 secured to the upper face of the flexible chamber 37. During normal flight the chamber 37 is inflated and expanded, lifting the connected rod ends 42 and thus holding the free outside ends 41 of the signal rods down against the top of the instrument panel 36.

*Operation*

In normal flight the airstream is separated in front of the wing's leading edge above the vane 5. The lower branch of the split airstream flows against the top side of the vane blade and consequently presses the vane down and so pressing the suction port 15 of the valve closed. The airstream induced positive pressure zone in front of the open vane chamber 1 is in pressure connection with the valve chamber 11 through the open inlet port 14. The induced positive pressure in the conduit 22 inflates the gust absorption chamber 32 as indicated by the dotted line. The airflow actuated motor means in the form of the bladder 37 is also expanded, consequently holding the signal rods 38 in "down" or "off" position.

When the aircraft's angle of attack increases and approaches a stall, then the air separation point of the split airstream drops below the vane blade 5 and the upper branch of the split airstream presses it upwards closing the inlet port 14 and opening the outlet port 15 as shown in the drawing. As the control vane is of the unstable type, its action is decisive, it changes position when the airstream passes a particular angle of attack, it is either open or closed. The vane-valve is installed in such a position and location to effect a pressure reversal in the control conduit 22, slightly before the increased angle of attack causes the aircraft to stall. The negative pressure zone on top of the wing 2 is now in fluid connection with the valve chamber 11. The suction in the control conduit 22 first draws the air from the inflated gust absorption bladder 32 and contracts same as shown in the drawing. Only after the gust absorption device 32 is exhausted or collapsed and contracted will the negative pressure build up to its maximum and be sufficient to effect a signal. As the outside portion of the signal lever 38 is heavier than the inside portion and consequently tends to stay in "down" position, momentary gust induced pressure changes will therefore come and go before the gust absorbing action retarding means 32 is exhausted. Angle of attack increases of very short duration caused by momentary air gusts therefore do not effect repeated unnecessary signals, which become a nuisance in bumpy flying weather. The duration of the lost action is determined by the relative proportion of the conduit size and chamber capacity. Continued suction however will contract the air chamber 37 and the connector 43 disposed on the movable upper portion thereof will pull the signal lever into signalling position as shown in Figure 3.

*Modified forms*

Figure 4:
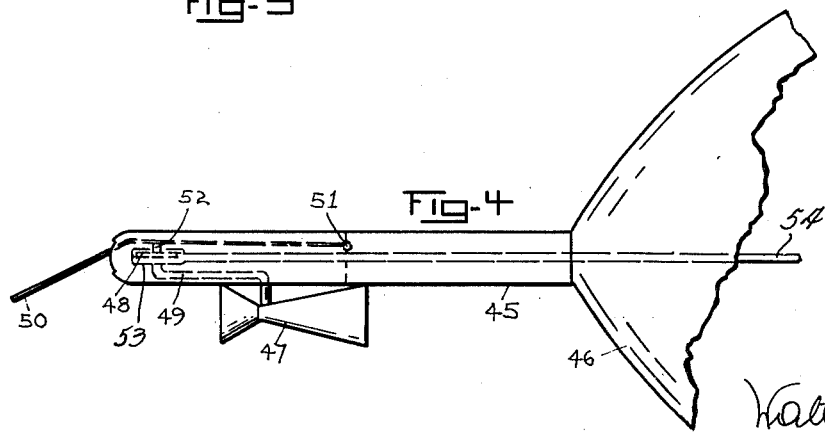
Figure 4 illustrates a modified form of vane-valve installation on a tube projecting forward from an aircraft into the undisturbed airstream.

The installation of the control means for the airflow in the control conduit 22 is not limited to the above described form. On some types of aircraft it is preferable to install the vane on the nose of the fuselage. On other types the vane is preferably mounted in the undisturbed airstream as illustrated in Figure 4. A tube 45 having a front end opening projects from the aircraft 46 forward into the undisturbed airstream. The throat of a Venturi tube 47 provides a zone of negative pressure in fluid connection through a conduit 49 with a valve chamber 53 having ports and valve seats for a valve 48. A vane 50 has a pivot 51 and a connector 52 similar to the vane and valve shown in Figure 1. A control conduit 54 extends into the aircraft body.

A contractible and expansible chamber can also be operatively connected with the manually operated elevator control of the aircraft to apply pressure thereon and move same when approaching a stall.

On some installations the suction conduit 16 may be omitted in which form the signal would be operated by positive pressure only.

While I have described my invention in detail in its preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. An angle of attack indicator for aircraft comprising a control conduit connecting airflow actuated motor means with valve means for controlling the airflow therein, said valve means comprising a valve chamber having two ports, conduit means fluid connecting one of said ports with an aircraft zone subject to positive pressure during flight, conduit means fluid connecting the other port with an aircraft zone subject to negative pressure during flight, a valve seat adjacent each of said ports, a valve adapted to oscillate between said valve seats closing either port upon contact therewith, a control vane oscillatably mounted on an aircraft member having an oscillatable vane portion positioned within the airstream flowing about the aircraft during flight, said control vane operatively coupled with said valve for alternate opening and closing of said ports upon oscillation of said valve between said valve seats in accordance with direction changes of the airstream against said control vane, a control-conduit fluid connecting said valve chamber with said airflow actuated motor means, the latter comprising an expansible and contractible chamber responsive to pressure reversal in the fluid connected control-conduit, a connector disposed on a movable portion of said chamber, movable signalling means positioned within the pilot's line of vision through the windshield comprising a lever operatively connected with said connector to move with the expansion and contraction of said chamber controlled by said vane and valve.

2. In an angle of attack governed apparatus for aircraft, control means for the airflow in a control-conduit comprising valve means having a port, one end of said control-conduit fluid connected to one side of said port, the other side of said port in fluid connection with the airstream flowing about the aircraft in flight, a valve for said control-conduit adapted to open and close said port, an unstable oscillatable control vane projecting from the leading edge of an aircraft member to within the airstream flowing about said aircraft member in flight, said control vane operatively coupled with said valve for opening and closing of said port upon oscillating between an open and a closed valve position in accordance with direction changes of the airstream against said control vane, the airflow in said control-conduit induced solely by said airstream and controlled by said vane and valve, gust pressure absorption means comprising an expansible and contractible air chamber in fluid connection with said control-conduit adapted to expand and contract with pressure changes in said control conduit, the other end of said control-conduit terminating in an apparatus member operated solely by the air-flow in said control conduit.

3. In an angle of attack governed apparatus for aircraft, control means for the airflow in a control-conduit comprising a valve chamber having two ports, conduit means fluid connecting one of said ports with the airstream flowing about the aircraft in flight, the other port in fluid connection with the atmosphere outside the conduit means, a valve seat adjacent each of said ports, a valve adapted to oscillate between said valve seats closing either port upon contact therewith, a control vane oscillatably mounted on an aircraft member having an oscillatable vane portion positioned within said airstream, said control vane operatively coupled with said valve for alternate opening and closing of said ports upon oscillation of said valve between said valve seats in accordance with direction changes of the airstream against said control vane, a control-conduit fluid connected to said valve chamber having the airstream induced airflow therein controlled by said vane and valve.

4. In an angle of attack governed apparatus for aircraft, control means for the airflow in a control-conduit comprising a valve chamber having two ports, conduit means fluid connecting one of said ports with an aircraft zone subject to positive pressure during flight, conduit means fluid connecting the other port with an aircraft zone subject to negative pressure during flight, a valve seat adjacent each of said ports, a valve adapted to oscillate between said valve seats closing either port upon contact therewith, a control vane oscillatably mounted on an aircraft member having an oscillatable vane portion positioned within the airstream flowing about the aircraft during flight, said control vane operatively coupled with said valve for alternate opening and closing of said ports upon oscillation of said valve between said valve seats in accordance with direction changes of the airstream against said control vane, a control-conduit fluid connected to said valve chamber having the airflow reversal therein controlled by said vane and valve.

5. In an angle of attack governed apparatus for aircraft, control means for the airflow in a control-conduit as described in claim 4 being further characterized in that a gust absorption means comprises an expansible and contractible chamber in fluid connection with said control-conduit adapted to expand and contract with pressure changes in said control conduit.

6. In an angle of attack governed apparatus for aircraft, control means as described in claim 4 being further characterized in that an expansible and contractible chamber is fluid connected with said control-conduit, a connector disposed on a movable portion of said chamber, an apparatus member operatively connected to said connector and the motion thereof controlled by the expansion and contraction of said chamber in response to pressure reversal in said control conduit.

7. Sole motor means and control means for an angle of attack governed aircraft apparatus comprising a conduit means having one end opening to the airstream flowing about the aircraft during flight, the other end of said conduit fluid connected to motor means operated by the airflow induced by the airstream at said open conduit end, a valve disposed adjacent said open conduit end having an air-inlet position and an air-outlet position for controlling the airflow reversal in said conduit, air-inlet means associated with said valve in fluid connection with said airstream and with said motor means through said conduit when said valve is in air-inlet position, air-outlet means associated with said valve in fluid connection with said motor means and with said airstream through said conduit when said valve is in air-outlet position, a control vane oscillably mounted on an aircraft member having an oscillatable vane portion positioned within the airstream flowing about the aircraft during flight, said control vane operatively coupled with said valve for oscillation therewith between said two valve positions in accordance with direction changes of the airstream against said control vane, said motor means comprising a flexible expansible and contractible chamber responsive to pressure changes in said fluid connected conduit, a motive connector disposed on a fluid pressure responsive portion of said chamber operatively connected with said aircraft apparatus to control and move the latter solely by the motive power induced by the airstream at said open conduit end in accordance with the direction of airflow against said control vane.

8. An angle of attack indicator for aircraft comprising control means and sole motor means as described in claim No. 7 being further characterized in that a movable signalling means comprising a movable signal rod positioned within the pilot's line of vision through the windshield is operatively connected with said motive connector on said motor means to move in opposite directions in accordance with the expansion and contraction of said chamber.

9. Sole motor means and control means for an angle of attack governed aircraft apparatus comprising a conduit means having one end opening to the airstream flowing about the aircraft during flight and the other end of said conduit fluid connected to motor means operated by the airflow induced by the airstream at said open conduit end, a valve for controlling the airflow reversal in said conduit disposed adjacent said open conduit end, a zone of positive air pressure and a zone of negative air pressure induced by the airstream in fluid connection with said valve, said valve having two positions, said motor means in fluid connection through said conduit with said zone of positive air pressure when said valve is in one position and in fluid connection through said conduit with said zone of negative air pressure when said valve is in the other position, a control vane oscillably mounted on an aircraft member having an oscillatable vane portion positioned within the airstream flowing about the aircraft during flight, said control vane operatively coupled with said valve for oscillation therewith between said two valve positions in accordance with direction changes of the airstream against said control vane, said motor means comprising a flexible expansible and contractible chamber responsive to pressure reversal in said fluid connected conduit, a motive connector disposed on a fluid pressure responsive portion of said chamber operatively connected with said aircraft apparatus to control and move the latter solely by the reciprocatory motive power induced by the airstream at said open conduit end in accordance with the direction of airflow against said control vane.

10. An angle of attack indicator for aircraft comprising motor and control means as described in claim No. 9 and being further characterized in that a movable signalling means positioned within the pilot's line of vision through the windshield comprising a movable signal rod, is operatively connected with said motive connector on said motor means to move in opposite directions in accordance with the expansion and contraction of said chamber.

11. In a angle of attack governed aircraft apparatus, motor and control means as described in claim No. 9, being further characterized in that a gust absorption means and action retarding means comprises a flexible expansible and contractible chamber in fluid connection with said conduit adapted to expand and contract with the pressure reversal in said conduit.

12. Sole motor means and control means for an angle of attack governed aircraft apparatus comprising a conduit means having open conduit ends opening to the airstream flowing about the aircraft during flight, the other end of said conduit fluid connected to motor means operated by the air-pressure induced by the airstream at said open conduit ends, said motor means comprising a flexible expansible and contractible air chamber responsive to pressure changes in the fluid connected conduit, valve means for controlling the airflow in said conduit associated with said open conduit ends, a control vane oscillatably mounted adjacent said open conduit ends having an oscillable vane portion positioned within the airstream flowing about the aircraft during flight, said control vane operatively coupled with a valve for oscillation therewith between two positions in accordance with direction changes of the airstream against said control vane, positive air-pressure induced by said airstream in a zone adjacent one face on said valve, negative air-pressure induced by said airstream in a zone adjacent an other face on said valve, fluid connection through said conduit between said motor means and said zone of positive air-pressure when said coupled vane and valve is in one of said positions, fluid connection through said conduit between said motor means and said zone of negative air-pressure when said coupled vane and valve is in the other of said positions whereby the pressure reversal in said conduit and motor means is controlled, the controlled aircraft apparatus operatively connected with said motor means to move in opposite directions in accordance with the pressure reversal in said conduit and expansion and contraction of said flexible airchamber.

13. Sole motor means and control means for an angle of attack governed aircraft apparatus comprising a conduit means having one end opening to the airstream flowing about the aircraft during flight and the other end of said conduit fluid connected to motor means operated by the air-pressure induced by said airstream at said open conduit end, said motor means comprising a flexible expansible and contractible chamber responsive to pressure changes in said fluid connected conduit, valve means disposed adjacent said open conduit end for controlling the airflow in said conduit, a control vane associated with said valve having an oscillable vane portion positioned within said airstream, the position of said valve being responsive solely to the position of said control vane responsive solely to the pressure of said airstream, whereby the flow of air through said conduit and the operation of said motor means is controlled, operative connection between a motive pressure responsive connector disposed on said motor means and the operated aircraft apparatus to control and operate the latter solely by the motive power induced by the airstream at said open conduit end in accordance with the direction of airflow against said control vane.

14. Sole motor means and control means for an angle of attack governed aircraft apparatus comprising a conduit means having one end opening to the airstream flowing about the aircraft during flight and the other end of said conduit fluid connected to motor means operated by the air-pressure induced by said airstream at said open conduit end, said motor means comprising a flexible expansible and contractible chamber responsive to pressure changes in said fluid connected conduit, control means associated with said open conduit end adapted to control the airflow reversal in said conduit and motor means comprising a device responsive to the airstream's angle of attack against said aircraft, said device alternately fluid connecting said conduit and motor means with a zone of negative air-pressure and with a zone of positive air-pressure induced by said airstream when the airstream passes predetermined angles of attack against said aircraft, operative connection between a motive connector on said motor means and the controlled aircraft apparatus to move the latter in opposite direction solely by the reciprocatory motive power induced by the airstream at said open conduit end in accordance with the direction of airflow against said device.

15. The combination of claim 12 wherein said zone of negative pressure is fluid connected with the throat of a Venturi tube.

16. The combination of claim 12 wherein a motive connector disposed on said motor means is operatively connected with the elevator control of an aircraft to apply pressure thereon and move same when the airstream passes predetermined angles of attack against said aircraft.

17. The combination of claim 13 wherein said open conduit end and valve means are fluid connected with the throat of a Venturi tube.

18. The combination of claim 13 wherein said motive connector disposed on said motor means is operatively connected with the elevator control of an aircraft to apply pressure thereon and move same when the airstream passes predetermined angles of attack against said aircraft.

19. The combination of claim 14 wherein said control means for the airflow in said conduit and motor means is fluid connected with the throat of a Venturi tube.

20. The combination of claim 14 wherein said motive connector disposed on said motor means is operatively connected with the elevator control of an aircraft to apply pressure thereon and move same when the airstream passes predetermined angles of attack against said aircraft.

WALTER GEHRIG.

References Cited in the file of this patent

UNITED STATES PATENTS

| Number | Name | Date |
| --- | --- | --- |
| Re. 23,042 | Upson | Oct. 5, 1948 |
| 207,165 | Cooper | Aug. 20, 1878 |
| 415,497 | Cavallaro | Nov. 19, 1889 |
| 2,110,730 | Holland, Jr. | Mar. 8, 1938 |
| 2,287,497 | Rockefeller | June 23, 1942 |
| 2,486,779 | Fairbanks | Nov. 1, 1949 |